United States Patent
Rigobert et al.

(10) Patent No.: US 9,159,976 B2
(45) Date of Patent: Oct. 13, 2015

(54) CONTAINER FOR A SEALED SECONDARY CELL

(75) Inventors: Gerard Rigobert, Fargues Saint Hilaire (FR); Luc Mermillod-Blondin, Saint Jean de Sixt (FR)

(73) Assignee: SAFT GROUPE SA, Bagnolet (FR)

( * ) Notice: Subject to any disclaimer, the term of this patent is extended or adjusted under 35 U.S.C. 154(b) by 818 days.

(21) Appl. No.: 12/815,606

(22) Filed: Jun. 15, 2010

(65) Prior Publication Data

US 2010/0314285 A1    Dec. 16, 2010

(30) Foreign Application Priority Data

Jun. 15, 2009 (FR) ...................................... 09 02910

(51) Int. Cl.
| | |
|---|---|
| H01M 2/12 | (2006.01) |
| H01M 2/26 | (2006.01) |
| H01M 2/34 | (2006.01) |

(52) U.S. Cl.
CPC .............. *H01M 2/1241* (2013.01); *H01M 2/26* (2013.01); *H01M 2/345* (2013.01)

(58) Field of Classification Search
CPC .......................... H01M 2/1241; H01M 2/1229
USPC ......................................................... 429/53
See application file for complete search history.

(56) References Cited

U.S. PATENT DOCUMENTS

| | | | |
|---|---|---|---|
| 6,139,986 A | 10/2000 | Kurokawa et al. | |
| 6,284,403 B1 * | 9/2001 | Tsurutani et al. | 429/53 |
| 2006/0019150 A1 | 1/2006 | Rigobert et al. | |
| 2007/0275293 A1 * | 11/2007 | Begg et al. | 429/53 |
| 2007/0275294 A1 * | 11/2007 | Stearns et al. | 429/56 |
| 2011/0052948 A1 * | 3/2011 | Pei | 429/56 |

FOREIGN PATENT DOCUMENTS

FR    2 873 495 A1    1/2006

* cited by examiner

*Primary Examiner* — Ula C Ruddock
*Assistant Examiner* — Archer Dudley
(74) *Attorney, Agent, or Firm* — Sughrue Mion, PLLC (57) ABSTRACT

A container for a sealed secondary cell containing an electrode plate group is provided comprising a wall forming a base (2) in electrically conducting material, the base comprising a peripheral portion (2a), a closure member portion (2b) and a weakened portion (2c) joining the peripheral portion (2a) to the closure member portion and designed to rupture in the presence of an excess pressure inside the container. An electrically insulating ring member (4) is mounted on the peripheral portion to support the electrode plate group, and the container includes an electrically conducting flexible connection part (3), electrically connected to the closure member portion (2b) and to the electrode plate group, in which, in the presence of an excess pressure leading to rupturing of the weakened portion, the connection part guides the closure member portion to a position after rupture which is substantially parallel to its position prior to rupture.

7 Claims, 6 Drawing Sheets

CONTAINER FOR A SEALED SECONDARY CELL

FIELD OF THE INVENTION

The present invention relates to a container for a sealed secondary cell.

BACKGROUND OF THE INVENTION

A sealed electrochemical storage cell or secondary cell (both terms being equivalent, we shall use the term secondary cell in this specification) conventionally comprises an electrode plate group made up of alternating positive and negative electrodes on either side of electrolyte-impregnated separators. Each electrode is made up of a metallic current collector supporting an electrochemically active material on at least one of its faces. Each electrode is electrically connected to a power output terminal which provides electrical continuity between the electrode and an external application with which the cell is associated. The electrode plate group is placed in a container that is sealingly closed by a cover.

The invention relates to sealed secondary cells, of for example the primary lithium or lithium ion types. These cells may be of cylindrical format or of rectangular format (also known as prismatic format).

A cell is generally designed to operate under so-called "nominal" conditions, i.e. within given ranges of temperature, current, and voltage. When a sealed cell is used outside the nominal conditions, for example in the event of accidental overcharging, or a short circuit, or a temperature higher than the maximum operating temperature, etc., there is a danger of explosion. This is because such situations lead to electrochemical reactions with generation of gas. An accumulation of such gases inside the container increases the internal pressure of the cell which can lead to the container bursting violently and to chemical compounds that are harmful and corrosive for the environment and for people situated nearby being sprayed out.

Safety devices exist that prevent gas from accumulating inside the container of a sealed cell and that enable the gas to be exhausted when the internal pressure exceeds a predetermined value.

Further, is essential for a safety device for a secondary cell to also incorporate a circuit breaking function able to electrically isolate, irreversibly, the secondary cell from apparatus connected thereto.

Figure 1A:
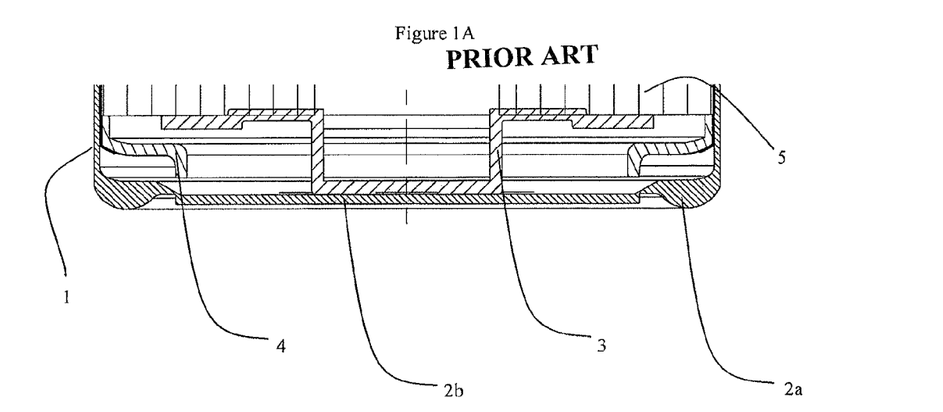
FIG. 1A is a longitudinal cross-section through the base of a prior art container.
Figure 1B:
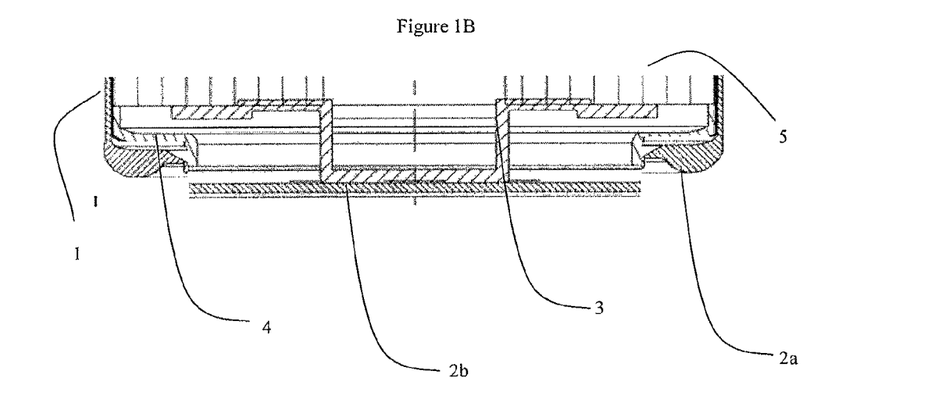
FIG. 1B is a longitudinal cross-section of the base of this container, the closure member portion of which is disconnected from the peripheral portion.

French patent 2,873,495 (US 2006 0019150) discloses a sealed secondary cell. The cell consists of alternating positive and negative electrodes connected to their respective power output terminals. The electrodes are arranged in a container having a cylindrical wall closed off by a base. The base is made up of three portions, a peripheral portion connected to the cylindrical wall, a releasable closure member portion and a thinned portion connecting the closure member portion to the peripheral portion. The thinning is adapted to be torn as a result of excess pressure inside the container. A planar connection connects the positive electrode of the electrode plate group to the wall of the base of the container, the walls of the container being electrically conducting with the cover. An annular seal is located between the electrode plate group and the bottom of the container. This acts as an electrical insulator to prevent electrical contact between an edge of a negative electrode of the plate group and the wall of the container connected to the positive terminal, which could bring about a short circuit after the safety device has been actuated. Tearing of the thinning is adapted to interrupt electrical conduction between the electrodes of one polarity and their power output terminal by disconnecting the releasable closure member portion from the peripheral portion. The electrode plate group is in abutment with the connection part. In the presence of excess pressure, the thinned portion tears and the electrode plate group which bears on the releasable closure member portion via the connection part shifts towards the bottom of the container, tearing the totality of the thinned portion in order to break the electrical connection between the positive electrode of the electrode plate group and the cover of the container. FIGS. 1A and 1B respectively show a longitudinal cross-section of the lower portion of a similar container and a cross-sectional view when the closure member portion is disconnected.

Such a container nevertheless has the disadvantage of being vulnerable to jolting and impact. In effect, the electrode plate group, which is the heaviest part of the element, is lying on the releasable closure member portion. In the presence of jolts or impact, the weight of the electrode plate group exercises a force which may cause the thinning to tear thereby undesirably disconnecting the closure member portion from the peripheral portion. It has been observed that the closure member portion initially designed to open at a cell internal pressure greater than or equal to 8 bar to 12 bar (depending on cell capacity) does in reality, and not in the presence of jolts or impact, open at a lower internal pressure (between 0 and 6 bar). This can be explained by a weakening of the thinning brought about by jolting or impacts. Given that a secondary cell can have an internal pressure of 6 bar at the end of its lifetime, untoward opening of the closure member portion can occur.

SUMMARY OF THE INVENTION

There is consequently a need for a container that includes a closure member portion making it possible to break off electrical connection in the presence of excess pressure which is less vulnerable to jolting or impact.

To this end, the present invention provides a container for a sealed secondary cell adapted to contain an electrode plate group, the container comprising:
  a wall forming a base in electrically conducting material, the base comprising:
    a peripheral portion,
    a closure member portion,
    a weakened portion delimiting the closure member portion, joining the peripheral portion to the closure member portion, and adapted to rupture in the presence of an excess pressure inside the container,
    an electrically insulating ring member mounted on said peripheral portion adapted to act as a support for the electrode plate group,
  wherein the container comprises
    an electrically conducting flexible connection part, electrically connected to the closure member portion and adapted to be electrically connected to the electrode plate group,
  in which, in the presence of an excess pressure leading to rupturing of said weakened portion, the connection part guides the closure member portion to a position after rupture which is substantially parallel to the position thereof prior to rupture.

In various embodiments, the container can comprise one or more of the following characteristics:

the flexible connection part comprises a connecting portion adapted to be electrically connected to the electrode plate group, and a central portion in contact with the closure member portion, the flexible connection part comprises a set of identical, spiraling, flexible thin strip portions uniformly distributed and connecting the central portion to the connecting portion thereof, the thin strip portions substantially form a swastika-shaped cross, the closure member portion is fixed to the said central portion and wherein, upon displacement of the closure member portion from its position prior to rupture to its position after rupture, the closure member portion and the central portion perform a helical movement directed towards the outside of the container.

the connecting portion and the central portion are of a circular shape.

the connecting portion and the central portion are located in two substantially parallel and offset planes.

the flexible connection part is mounted on the insulating ring member, the ring member electrically insulating the flexible connection part from the said peripheral portion after rupture.

the weakened portion is a portion of a thickness less than that of the closure member portion and the peripheral portion.

the connection part is of aluminum.

The invention further provides a sealed secondary cell comprising:

the above-described container, an electrode plate group inside the container in abutment with the insulating ring member, in which rupturing of the portion of reduced strength is adapted to break off electrical conduction, passing via the closure member portion, between the electrode plate group and a corresponding power output terminal.

Further characteristics and advantages of the invention will become more clear from the description which follows given by way of example and with reference to the attached drawings.

BRIEF DESCRIPTION OF THE DRAWINGS

FIG. 3a is a top view of a first embodiment of the connection part.

FIG. 3b is an elevation view of FIG. 3a.

DETAILED DESCRIPTION OF PREFERRED EMBODIMENTS

The container according to the invention will now be described. This container comprises a lateral wall and a wall forming a base in conducting material. The wall forming the base comprises a peripheral portion electrically connected to the lateral wall, a closure member portion and a portion of reduced strength around the closure member portion, joining the closure member portion to the peripheral portion. In the case of excess pressure inside the container, the portion of reduced strength is designed to rupture in order to allow the gas under excess pressure in the container to escape. The container includes an electrically insulating ring member, mounted on the peripheral portion. This ring member is designed to support an electrode plate group. It acts as an electrical insulator in order to prevent electrical contact between the edge of an electrode of the group and the wall of the container connected to an electrode of opposite polarity, which could give rise to an internal short circuit after activation of the safety device. The container includes a flexible electrically conducting connection part, in electrical contact with the closure member portion. By the expression "flexible part", we mean a part which gets deformed when excess pressure pushes the closure member portion outwardly, the part being fixed to the closure member portion. In the presence of excess pressure bringing about rupture of said portion of reduced strength, the connection part guides the closure member portion towards a position after rupture which is substantially parallel to its position prior to rupture.

The electrode plate group bears against the insulating ring member and the connection part electrically connecting the electrode plate group to the closure member portion is flexible. The electrode plate group does not bear against the closure member portion, but only on the peripheral portion via the insulating ring member. As a consequence, in the presence of jolts or impact, the weight of the electrode plate group does not exercise a force on the closure member portion and consequently does not bring about rupture of the portion of reduced strength. Excess pressure does however create a pushing force on the closure member portion directed towards the outside of the container. The pushing force causes the portion of reduced strength to rupture. Thanks to the closure member portion being guided to a position parallel to its position prior to rupture, complete rupturing of the portion of reduced strength around the closure member portion will occur. As a consequence, there is a guarantee that the closure member portion will be disconnected from the peripheral portion. The container consequently provides for electrical disconnection of an electrode from its associated terminal while withstanding jolting of the electro-plate group in the container.

Figure 3:
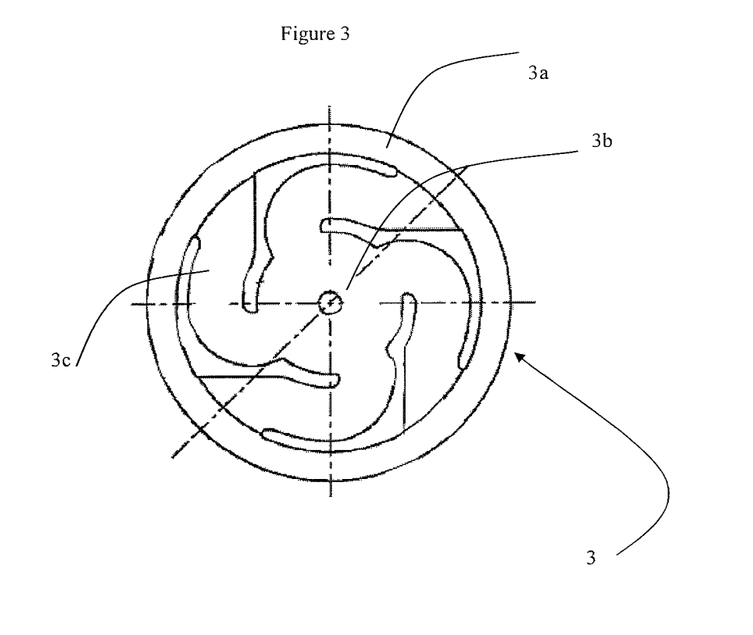
Figure 3B:
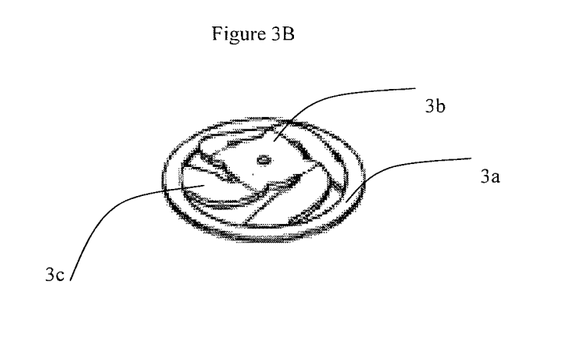

FIG. 3a and FIG. 3b show a flexible connection part according to a first embodiment. Flexibility of the connection part is provided both through the type of material chosen (material of low mechanical strength such as for example aluminum 1050) and by the geometry of the part which allows the connection part to deploy as will be described in more detail below.

On FIG. 3a, a top view of a connection part is shown. On FIG. 3b, an elevation view of the same connection part is shown The connection part is formed by a connecting portion 3a designed to be electrically connected to the electrode plate group, a central portion 3b designed to be fixed to the closure member portion and a plurality of flexible, identical, thin strip portions 3c connecting the central portion to the connecting portion. The thin strip portions have a spiral configuration, in other words they follow a curved path similar to a spiral, moving progressively away from the central portion 3b. The thin strip portions are uniformly distributed around the central portion 3b. The thin strip portions can spiral clockwise or anticlockwise. On FIG. 3a and FIG. 3b, the thin strip portions are turning clockwise. On FIG. 3a and FIG. 3b, there are four thin strip portions 3c substantially forming a swastika-like cross. The number of thin strip portions can be greater than four, or can be three in number. The fact of providing the thin strip portions 3c in this shape makes it possible to render the central portion 3b mobile with respect to connecting portion 3a by displacement of the central portion 3b with a helical movement the axis of which passes through the center of central portion 3b. Such movement of central portion 3b is a result of the fact that the thin strip portions 3c have a spiral configuration and deform in flexure. Thus, during their helical movement, the thin strip portions get deformed by flexing, becoming deployed (in other words becoming less and less curved). The force to produce deformation in flexure can be reduced by reducing the thickness of the thin strip portion. The connection part can include several thin strip portions which can be superposed and be less thick, so that the force to produce flexing is reduced while maintaining the resistivity of the connection part.

Figure 2A:
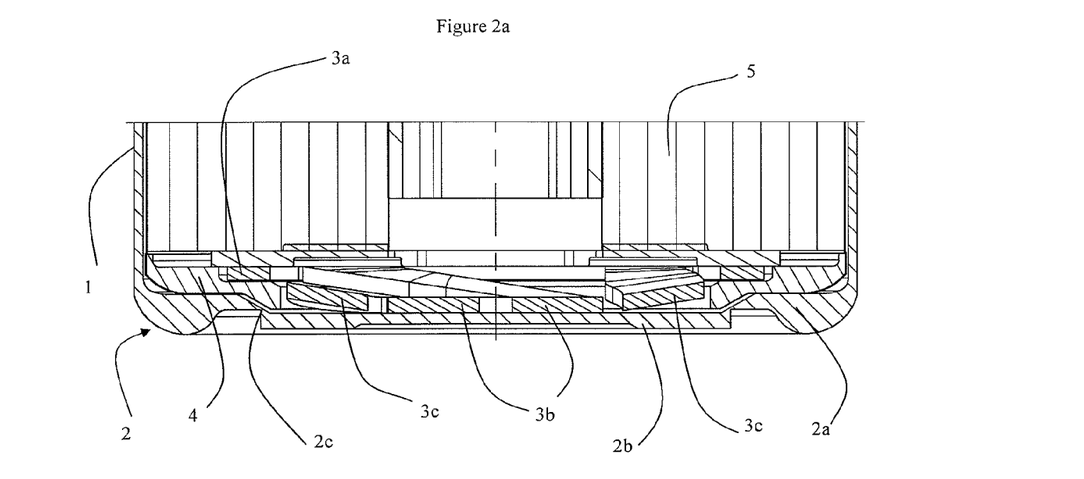
FIG. 2a is a longitudinal cross-section of the base of the container according to the invention.
Figure 2B:
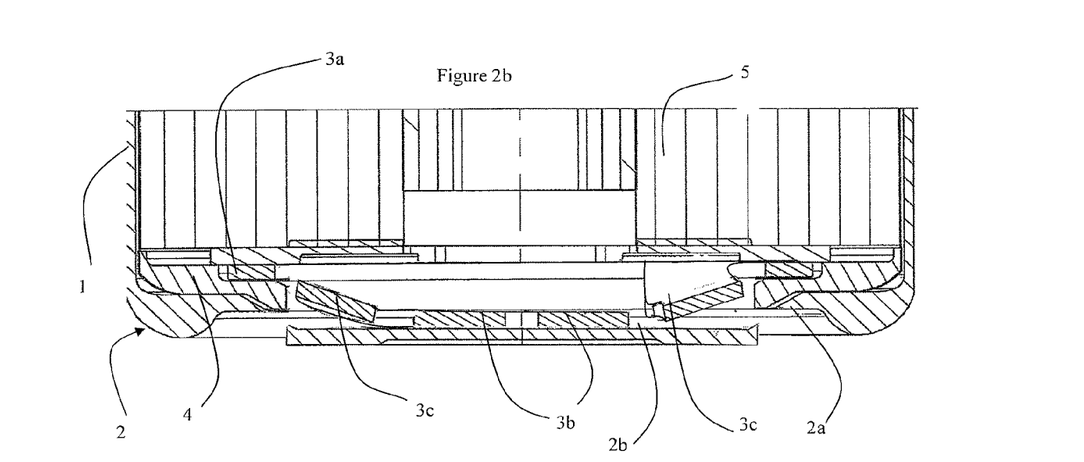
FIG. 2b is a longitudinal cross-section of the container according to the invention, the closure member portion of which is detached.

In the example of FIGS. 2a and 2b, the container has a substantially cylindrical format and only the end forming the base of the container has been illustrated. The base of the container includes a peripheral portion 2a, a closure member portion 2b and a portion of reduced strength 2c around the closure member portion 2b, joining the peripheral portion 2a to the closure member portion 2b. The portion of reduced strength 2c in FIG. 2a is a thinned-down portion. By it being thinned-down, we mean a region of the container wall the thickness of which is less than that of the central portion 3b and of the closure member portion. The peripheral portion 2a is electrically connected to the lateral wall 1. The lateral wall 1 and the parts forming the base are of electrically conducting material. The container also includes an electrically insulating ring member 4, mounted on the peripheral portion 2a. The insulating ring member 4 can for example be a seal. The container holds an electrode plate group 5 mounted on the insulating ring member 4.

The electrode plate group comprises alternating positive and negative electrodes flanking electrolyte-impregnated separators, in which the positive or negative electrodes are electrically connected to the flexible connection part 3 in electrically conducting material. The connection part can for example be of aluminum since this is a material having low resistivity and little resistance to bending. For example, the connection part can be of aluminum 1050. Below, we shall consider it is the positive electrodes which are electrically connected to the connection part 3. The connection part 3 constitutes part of the container.

Figure 6A:
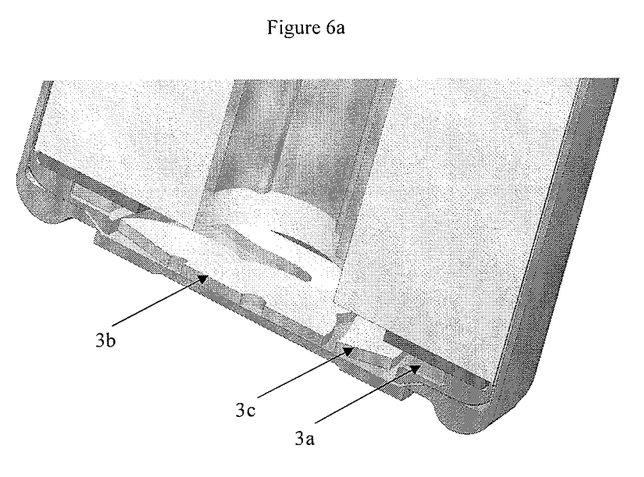
FIG. 6a and FIG. 6b are perspective views of FIG. 2a and FIG. 2b respectively with connection part of FIG. 3.
Figure 6B:
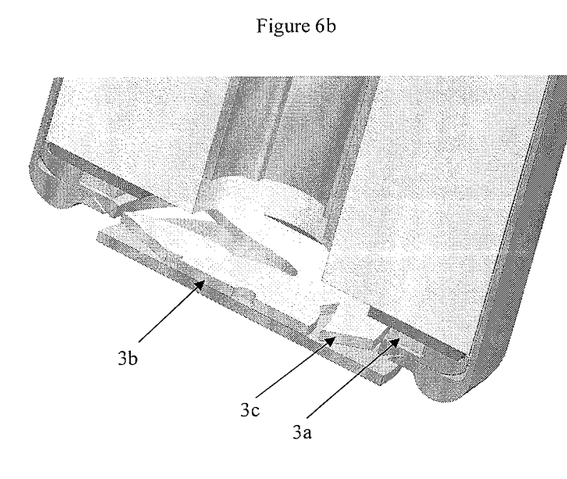

Connection part 3 includes at its periphery an annular connecting portion 3a of with a plane surface. This portion can also have a solid disc form. Connection part 3 includes a central portion 3b having a plane surface parallel to the surface of connecting portion 3a. This central portion 3b is located in a plane parallel to the plane surface of connecting portion 3a. Connecting portion 3a and central portion 3b are circular on a common axis. Nevertheless, these portions can have other shapes, such as square, rectangular, etc. Connection part 3 also includes identical flexible thin strip portions 3c joining central portion 3b to connecting portion 3a. The thin strip portions 3c are uniformly distributed around central portion 3b. Each thin strip portion 3c follows a spiral path with respect to the central portion 3b. The four thin strip portions with the central portion substantially form a "Basque cross" or a swastika cross with the thin strip portions forming the arms thereof. The connection part is symmetrical with respect to its center, which is the center of the central portion and connecting portion. The central portion 3b is fixed with the closure member portion 2b, and the positive electrodes of the electrode plate group 5 are electrically connected to connection part 3 via the connecting portion 3a. On FIGS. 2a and 2b the connecting portion 3a is mounted on a shoulder of insulating ring member 4, whereby the ring member electrically insulates connecting portion 3a from the peripheral portion 2a, after portion 2a of reduced strength has ruptured. The ring member 4 is consequently mounted between connection part 3 and the peripheral portion 2a. It will be obvious that connection part 3 is not necessarily mounted on ring member 4, for example, it can be fixed directly onto the electrode plate group 5. Thus, connection part 3 establishes the electrical linkage between the positive electrodes and closure member portion 2b. The thin strip portions 3c impart flexibility to connection part 3. Deformation in flexure of the thin strip portions 3c allows central portion 3b to shift with respect to connecting portion 3a. The displacement of central portion 3b with respect to the connecting portion is a helical movement about an axis passing through the center thereof. The degree of rotation of the central portion about itself is nevertheless very small compared to the rectilinear translation thereof, for example equivalent to 0.09°/1 mm giving a final travel of 0.54°/6.3 mm. The helical movement of central portion 3b is due to the fact that the thin strip portions 3c deform naturally in flexure prior to being subject to stretching. The result is that the plane surface of central portion 3b is always parallel to the plane surface of connecting portion 3a as shown by comparing FIG. 6a with FIG. 6b.

Connection part 3 can be of a one-piece construction produced by cutting out followed by stamping. The stamping operation makes it possible to stretch or draw the thin strip portions 3c so that central portion 3b is offset in a plane parallel to connecting portion 3b ready for assembly of the connection part in the container. Connection part 3 is highly flexible and does consequently not push on the closure member portion. Nevertheless, the connection part can be slightly compressed between the electrode plate group and the closure member portion in order for it to apply a force of 40 to 100 N on the closure member portion. As this force is known, the portion of reduced strength can be formed so that rupture of this portion is initiated as soon as the pressure exercised thereon is equal to the compression force of the connection part on the closure member portion plus the pressure equal to the excess pressure at which the closure member portion should open to avoid a risk of the container violently bursting and spraying out chemicals that are harmful and corrosive to the environment and persons in proximity to the container. This excess pressure can be a pressure greater than or equal to 5 bar.

In a further embodiment, the connection part is fixed at one end to the closure member portion and at the other end to the electrode plate group 5 or to the ring member 4 and is mounted under a tensile load in the container. As this force is also known, the portion of reduced strength can be formed whereby rupture of this portion is initiated as soon as the pressure exercised thereon is equal to the tensile load exercised by the connection part on the closure member portion, less a pressure equal to the excess pressure.

Figure 4:
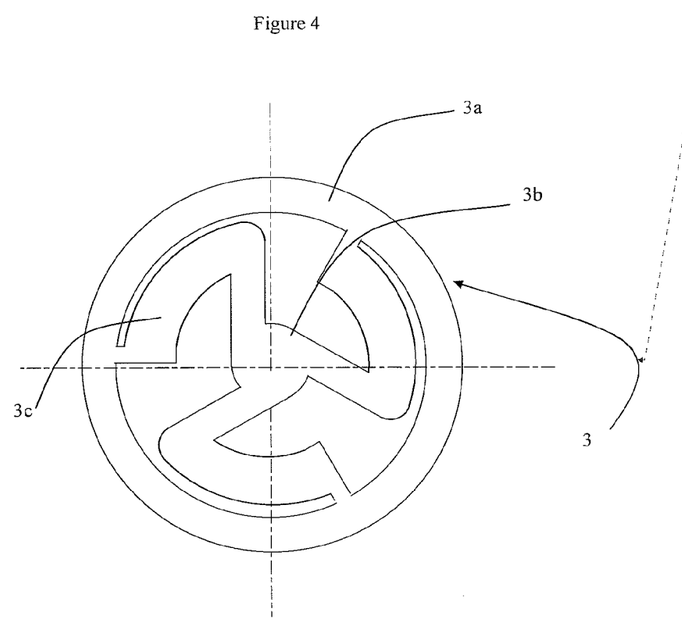
FIG. 4 is a top view of a second embodiment of the connection part.

FIG. 4 shows a second embodiment of connection part 3 in a top view. By a top view, we mean a view in which the portion of the connection part in the foreground is the connecting portion 3a. This second embodiment is based on the first embodiment described in relation with FIGS. 3a and 3b. The description in relation with the first embodiment is consequently also applicable to this second embodiment with the exception of the differences discussed below. Notably, the flexibility of the connection part is also provided both by the type of material chosen and by the geometry of the part which allows the connection part to deploy when the closure member portion is being pushed out by the gas causing excess pressure inside the container.

Unlike the first embodiment, this connection part 3 only has three thin strip portions. The thin strip portions have the same shape as the arms of the swastika-shaped cross except for the fact that the thin strip portions are directed anticlockwise while the arms of the swastika-shaped cross were directed clockwise. The three thin strip portions in a spiral configuration consequently have the effect of displacing central portion 3b with a helical movement anticlockwise. Connection part 3 consequently has a shape substantially forming a swastika-shaped cross with three arms directed anticlockwise.

Figure 5:
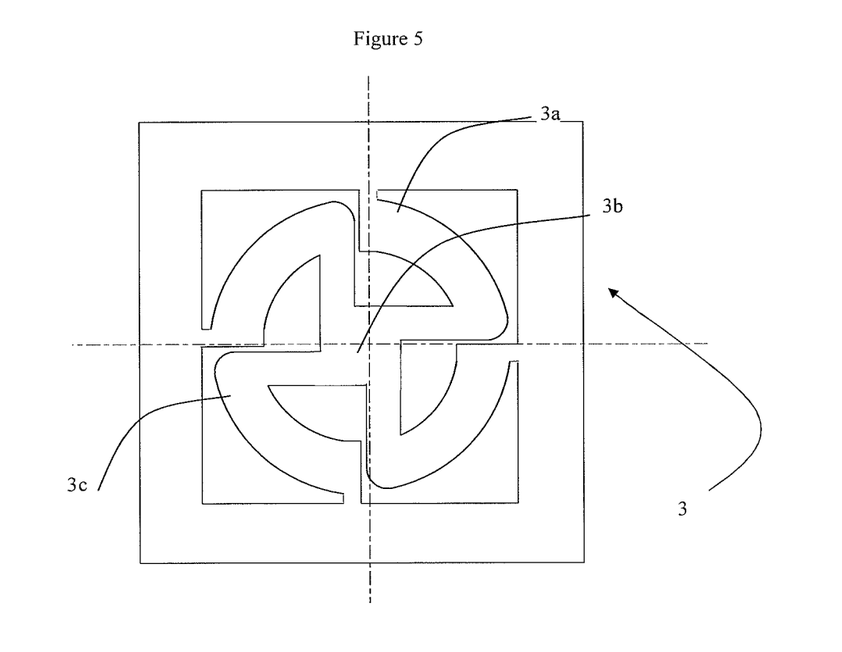
FIG. 5 is a top view of a third embodiment of the connection part.

FIG. 5 shows a third embodiment of connection part 3 in top view. This third embodiment is based on the first embodiment described in relation with FIG. 3a and FIG. 3b. The description of the first embodiment is consequently also applicable to this third embodiment except for the differences discussed below. Notably, the flexibility of the connection part is also provided both by the type of material chosen and by the geometry of the part which allows the connection part to deploy when the closure member portion is being pushed out following rupture of the portion of reduced strength under the influence of gases causing excess pressure inside the container.

Unlike the first embodiment, connecting portion 3a and central portion 3b have a square shape. The thin strip portions have the same shape as the arms of the swastika-shaped cross except that the thin strip portions are directed anticlockwise unlike the arms of the swastika-shaped cross which are directed clockwise. The four thin strip portions in a spiral configuration consequently displace central portion 3b with a helical movement anticlockwise. The thin strip portions 3c and the central portion 3b substantively form a swastika-shaped cross. Connecting portion 3a forms a frame which frames the swastika-shaped cross.

We shall now describe operating principles in a secondary cell which includes this container. The secondary cell comprises the container described above, and electrode plate group 5 in the container mounted on the insulating ring member 4, the electrode plate group 5 comprising alternating negative and positive electrodes flanking electrolyte-impregnated separators, and in which the positive electrodes are electrically connected to the connection part 3. The container further includes a cover fitted with two power output terminals. One of the terminals is a negative power output terminal connected to at least one negative electrode in the container and the other terminal is a positive power output terminal connected to at least one positive electrode in the container via the lateral wall 1, the wall forming the base 2 and the connection part 3. It is obviously possible to reverse the connection of the electrodes in other words to have the negative electrodes connected to one of the terminals of the cover via the connection part 3, and the walls of the container and the positive electrodes to the other terminal of the cover. Nevertheless, in this case, the connection part must be in a material other than aluminum such as copper, nickel or stainless steel. These materials do however not have the same mechanical characteristics notably as regards flexibility.

When there is excess pressure, for example as a result of an accidental overload or a short circuit or a temperature higher than maximum operating temperature, the walls of the container gets stretched under the forces exercised by the excess pressure. This leads to rupture of the portion of reduced strength 2c which tears between the closure member portion 2b and the peripheral portion 2a. The closure member portion 2b is pushed towards the outside of the container, and the central portion 3b which is fixed to the closure member portion 2b consequently also undergoes a movement in the direction of the outside of the container. FIG. 2B shows the closure member portion after the portion of reduced strength 2c has ruptured. In the cross-sectional view of FIG. 2B, only two of the thin strip portions can be seen in cross-section. Connecting portion 3a bearing against insulating ring member 4 has not changed position. As discussed above, the central portion gets displaced following a helical movement. This helical movement is also imposed on the closure member portion as a result of them being fixed to each other. The connection part consequently guides the displacement of the closure member portion. The helical displacement of the closure member portion 2b has the effect of completely tearing the region of reduced strength around the closure member portion 2b. The guiding of the displacement of closure member portion 2b ensures it completely detaches from peripheral portion 2a thereby breaking off the electrical connection between them. If the displacement of the closure member portion 2b were not guided, the portion of reduced strength 2c could not completely tear. In effect, the closure member portion 2b could pivot about the part which has not been torn, and consequently remain in electrical contact with peripheral portion 2a. Following the helical movement, closure member portion 2b consequently finds itself at a position substantially parallel to its position before rupture. This position makes it possible to ensure that the closure member portion 2b is no longer in contact with the peripheral portion 2a. As a consequence, the container offers greater resistance against jolting of the electrode plate group 5 while simultaneously ensuring electrical disconnection between the electrodes of one polarity and the associated power output terminal.

In another embodiment, the connection part 3 is mounted upside down in the container. By being mounted upside down, we mean that it is the connecting portion 3a which is connected to the closure member portion 2b and it is the central portion 3b which is electrically connected to the electrode plate group 5. The diameter of the closure member portion should be consequently at the least the diameter of connecting portion 3a. Further, the central portion 3b can be connected to the electrode plate group via an intermediate part.

The secondary cell according to the invention has applications in the field of aviation, space, defense, stationary applications and the automobile field.

Obviously, the present invention is not limited to the examples and embodiments described and illustrated but may be subject to numerous variations available to the skilled person.

The invention claimed is:
1. A sealed secondary cell comprising:
a container comprising:
  a wall forming a base in electrically conducting material, the base comprising:
    a peripheral portion,
    a closure member portion,
    a weakened portion delimiting the closure member portion, joining the peripheral portion to the closure member portion, and which ruptures in the presence of an excess pressure inside the container,
    an electrically insulating ring member mounted on said peripheral portion acting as a support for an electrode plate group,
  wherein the container comprises:

an electrically conducting flexible connection part comprising
- a connecting portion electrically connected to the electrode plate group, and
- a central portion in direct contact with the closure member portion and electrically connected to the closure member portion, the electrically conductive flexible connection part comprising a set of identical, spiraling, flexible thin strip portions uniformly distributed and connecting the central portion to the connecting portion thereof;

in which, in the presence of an excess pressure leading to rupturing of said weakened portion, the electrically conducting flexible connection part directly guides the closure member portion to a position after rupture which is substantially parallel to the position thereof prior to rupture, and the electrode plate group inside the container in abutment with the insulating ring member, in which rupturing of the weakened portion breaks off electrical conduction, passing via the closure member portion, between the electrode plate group and a corresponding power output terminal, wherein the closure member portion is fixed to said central portion and wherein, upon displacement of the closure member portion from the position thereof prior to rupture to the position after rupture, the closure member portion and the central portion perform a helical movement directed towards the outside of the container.

2. A sealed secondary cell according to claim 1, in which the thin strip portions substantially form a swastika-shaped cross.

3. A sealed secondary cell according to claim 1, in which said connecting portion and said central portion are of a circular shape.

4. A sealed secondary cell according to claim 1, in which the connecting portion and the central portion are located in two substantially parallel and offset planes.

5. A sealed secondary cell according to claim 1, wherein the electrically conducting flexible connection part is mounted on said insulating ring member, the ring member electrically insulating the flexible connection part from said peripheral portion after rupture.

6. A sealed secondary cell according to claim 1, in which the weakened portion is a portion of a thickness less than that of the closure member portion and the peripheral portion.

7. A sealed secondary cell according to claim 1, in which the connection part is of aluminum.

* * * * *